United States Patent
Heatherly et al.

(10) Patent No.: US 8,998,671 B2
(45) Date of Patent: Apr. 7, 2015

(54) INTERACTIVE TOY WITH EMBEDDED VISION SYSTEM

(75) Inventors: Christopher Heatherly, Monrovia, CA (US); Kenlip Ong, Burbank, CA (US); Scott Traylor, Needham, MA (US); Christine Donadio, Providence, RI (US); Liane Czirjak, Cumberland, RI (US); Leah Osterman, Carlisle, MA (US); Jordan Bach, Arlington, MA (US)

(73) Assignee: Disney Enterprises, Inc., Burbank, CA (US)

( * ) Notice: Subject to any disclaimer, the term of this patent is extended or adjusted under 35 U.S.C. 154(b) by 179 days.

(21) Appl. No.: 12/895,753

(22) Filed: Sep. 30, 2010

(65) Prior Publication Data

US 2012/0083182 A1 Apr. 5, 2012

(51) Int. Cl.
| | |
|---|---|
| *A63H 30/00* | (2006.01) |
| *G09B 5/06* | (2006.01) |
| *G09B 7/02* | (2006.01) |

(52) U.S. Cl.
CPC .. *G09B 5/06* (2013.01); *G09B 7/02* (2013.01); *A63H 2200/00* (2013.01)

(58) Field of Classification Search
USPC .......................................................... 446/175
See application file for complete search history.

(56) References Cited

U.S. PATENT DOCUMENTS

| | | | |
|---|---|---|---|
| 6,312,337 B1 * | 11/2001 | Edwards et al. ................ 463/42 |
| 6,730,900 B2 | 5/2004 | Hsish et al. | |
| 6,733,360 B2 | 5/2004 | Dooley et al. | |
| 6,985,139 B2 * | 1/2006 | Marggraff et al. ............ 345/179 |
| 7,062,073 B1 * | 6/2006 | Tumey et al. .................. 382/118 |
| 7,085,693 B2 * | 8/2006 | Zimmerman ..................... 703/6 |
| 7,196,391 B2 | 3/2007 | Hsish | |
| 7,276,749 B2 | 10/2007 | Martin et al. | |
| 2002/0004419 A1 * | 1/2002 | Odake et al. ....................... 463/7 |
| 2002/0135581 A1 | 9/2002 | Russell et al. | |
| 2003/0175673 A1 * | 9/2003 | Lee ................................ 434/319 |
| 2005/0064936 A1 | 3/2005 | Pryor | |
| 2005/0105769 A1 * | 5/2005 | Sloan et al. .................... 382/103 |
| 2006/0154559 A1 * | 7/2006 | Yoshida ......................... 446/297 |
| 2006/0161218 A1 | 7/2006 | Danilov | |
| 2006/0202953 A1 | 9/2006 | Pryor et al. | |
| 2008/0144854 A1 | 6/2008 | Abreu | |
| 2008/0228239 A1 | 9/2008 | Tyler et al. | |
| 2012/0015333 A1 * | 1/2012 | Self et al. ...................... 434/167 |
| 2012/0015341 A1 * | 1/2012 | Self et al. ...................... 434/365 |

OTHER PUBLICATIONS

Nasim, Fasil, Ghani, Usman, and Abbas, Syed Raza, "Autonomous Roverbot Using Scene Analysis" N.E D. University of Engineering and Technology, Karachi, published Dec. 2006.

(Continued)

*Primary Examiner* — Tramar Harper

(74) *Attorney, Agent, or Firm* — Ference & Associates LLC

(57) ABSTRACT

Systems and associated methods for providing a play device capable of capturing an image stream through a camera module and process the images through computer vision software. Embodiments provide interactive toys that recognize a set of pre-programmed images and provide responses to images presented by a user. For example, embodiments provide for a toy that requests a certain image and provides a response based upon whether the user presents the correct image.

20 Claims, 3 Drawing Sheets

(56) References Cited

OTHER PUBLICATIONS

Sabbi, Anup S., "Object Tracking in a Stereo System Using Particle Filter", University of Texas, Arllngton, Technical Report, published May 2005.

Liu, Ziaotao, Corner, Mark; and Shenoy, Prashant, "SEVA: SensorEnhanced Video Annotation", University of Massachusetts, Amherst, published Nov. 5, 2005.

* cited by examiner

INTERACTIVE TOY WITH EMBEDDED VISION SYSTEM

FIELD OF THE INVENTION

The subject matter presented herein generally relates to toys, and interactive toys in particular.

BACKGROUND

Conventional toys are being enhanced with increasingly sophisticated interactive components. Examples include plush toys that react to pressure at designated stimulus sensors and dolls that verbalize a set of pre-programmed phrases in response to audio cues. These developments have contributed to a more engaging play experience for the child. Such toys, however, do not provide a level of interaction wherein the toy and the child are able to see and interact with visual objects, especially in a combinatorial or sequential manner. The integration of a visual data stream that would allow the toy to recognize information would greatly increase the entertainment and educational value of play interaction.

BRIEF SUMMARY

Embodiments provide a play device capable of capturing an image stream through a camera module and process the images through computer vision software. Embodiments broadly contemplate interactive toys that recognize a set of pre-programmed images and provide responses to images presented by a user. For example, embodiments provide for a toy that requests a certain image and provides a response based upon whether the user presents the correct image.

In summary, one aspect provides an interactive toy system comprising: a toy comprising one or more interactive functions; one or more video capturing modules configured to send image information to one or more video processing modules, the one or more video processing modules generating recognition information designating whether image information matches one or more pre-programmed images; one or more microprocessors configured to receive recognition information; wherein the one or more microprocessors activate one or more interactive functions based on the recognition information received.

Another aspect provides a method for providing an interactive toy comprising: providing a toy comprising one or more interactive functions; embedding one or more video capturing modules, one or more video processing modules, and one or more microprocessors in the toy; configuring the one or more video capturing modules to send image information to the one or more video processing modules, the one or more video processing modules generating recognition information designating whether image information matches one or more pre-programmed images; configuring the one or more microprocessors to receive recognition information; wherein the one or more microprocessors activate one or more interactive functions based on the recognition information received.

The foregoing is a summary. For a better understanding of example embodiments, together with other and further features and advantages thereof, reference is made to the following description, taken in conjunction with the accompanying drawings, and the scope of the invention will be pointed out in the appended claims.

DETAILED DESCRIPTION

Figure 1:
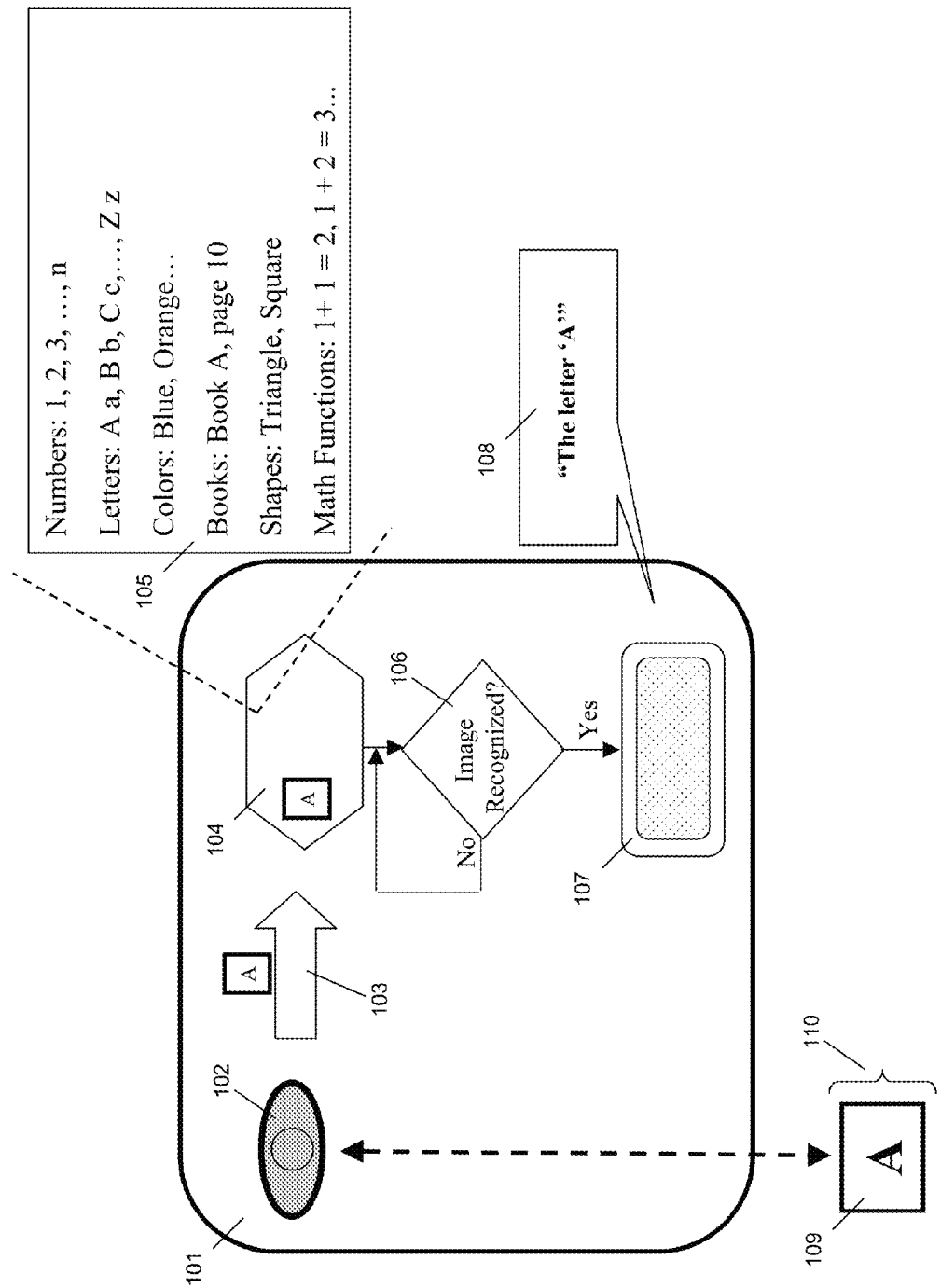
FIG. 1 illustrates an example toy with computer vision technology.

Components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of example embodiments. Furthermore, the described features, structures, or characteristics may be combined in any suitable manner in one or more embodiments. In the following description, numerous specific details are provided to give a thorough understanding of embodiments.

Reference throughout this specification to embodiment(s) means that a particular feature, structure, or characteristic described in connection with the embodiment is included in at least one embodiment. Thus, appearances of the phrases "certain embodiments" or "example embodiment" or the like in various places throughout this specification are not necessarily all referring to the same embodiment.

Modern toys often include functionally aimed at making them more interactive and responsive to certain external stimuli. However, they generally have not been able to adequately respond to vision input. For example, RFID and certain light-sensing technologies, such as IR and LED, have been used to create the illusion of responsive vision detection capabilities. Nevertheless, they fall short of effective visual recognition because of certain shortcomings, such as having a very limited operable range.

Accordingly, embodiments provide systems and methods to implement vision recognition technology in a toy. This can be implemented in a variety of play devices, including, but not limited to, plush toys, dolls, and animatronic toys.

Embodiments provide for embedding computer vision technology in a play device. In addition, embodiments provide for a toy that uses a vision stream as a means to recognize information, objects, and images that it has been trained to recognize. Furthermore, embodiments enable a toy that provides a response to received images. To accomplish this, embodiments employ a video capturing module in connection with computer vision software, wherein the computer vision software operates to recognize images provided by the video capturing module. A non-limiting example of a video capturing module is a CMOS camera module. In addition, the computer vision software can be any available software that is able to receive video images from a camera module, process the images, and determine whether the images match certain pre-programmed images. Embodiments provide that the embedded CMOS camera module is connected to a circuit that runs the computer vision software, and the data is processed through an embedded microprocessor.

A toy according to certain embodiments has the ability to detect visual images and output appropriate responses when integrated with computer vision technology. In addition, embodiments provide that the toy utilizes the vision detection for certain functions, including, but not limited to, motion planning, gameplay response, storytelling, and educational applications.

The description now turns to the figures. The illustrated example embodiments will be best understood by reference to the figures. The following description is intended only by way of example and simply illustrates certain embodiments representative of the invention, as claimed.

Referring to FIG. 1, a toy with computer vision technology according to an embodiment is illustrated. The toy 101 is embedded with a video capturing module 102. The placement of a video capturing module is not limited to a specific location within a toy, however, a forward orientated position facilitates typical interactive image capture. As a non-limiting example, the placement of a video capturing module in a plush doll may be positioned in the eyes, chest, or forehead. The data stream 103 from the video capturing module 102 is processed by a video processing module 104. The video processing module 104 is programmed to recognize certain pre-programmed images 105. Embodiments provide that the pre-programmed images may be 2D images or 3D objects, including, but not limited to, numbers, letters, words, mathematical functions, clothing, patterns, colors, shapes, specific toys, and particular pages in a book. The toy 101 may give a response when the video capturing module captures a pre-programmed image. In the example depicted in FIG. 1, the toy 101, through the vision processing module 104, recognizes the image 109 presented on a flashcard 110. The recognition is processed by the processor 107 and the toy provides a response 108. Embodiments provide, as depicted in FIG. 1, that the response 108 may be in the form of speech by the toy. However, the range of responses are not limited to speech as embodiments encompass potential responses of a toy, including, but not limited to, motion, speech, lighting, coloring, status, and changes thereto. In addition, embodiments provide that non-recognized images may also be processed and responses generated thereto. As a non-limiting examples, the toy may state that it does not recognize the image, ask what the image is, or store the image for future learning.

Embodiments provide that the toy may be associated with a pre-determined set of image materials, including flashcards, books, clothing, and other toys. The image processing module may be programmed to recognize this set of image materials, as well as other objects, including, but not limited to, standard household objects. As such, embedding such play devices for capturing and processing images creates a software environment that identifies specific information and additionally extrapolates their geo-spatial information. This enables a toy according to an embodiment to have a rudimentary understanding of the what images are being shown and their location.

Figure 2:
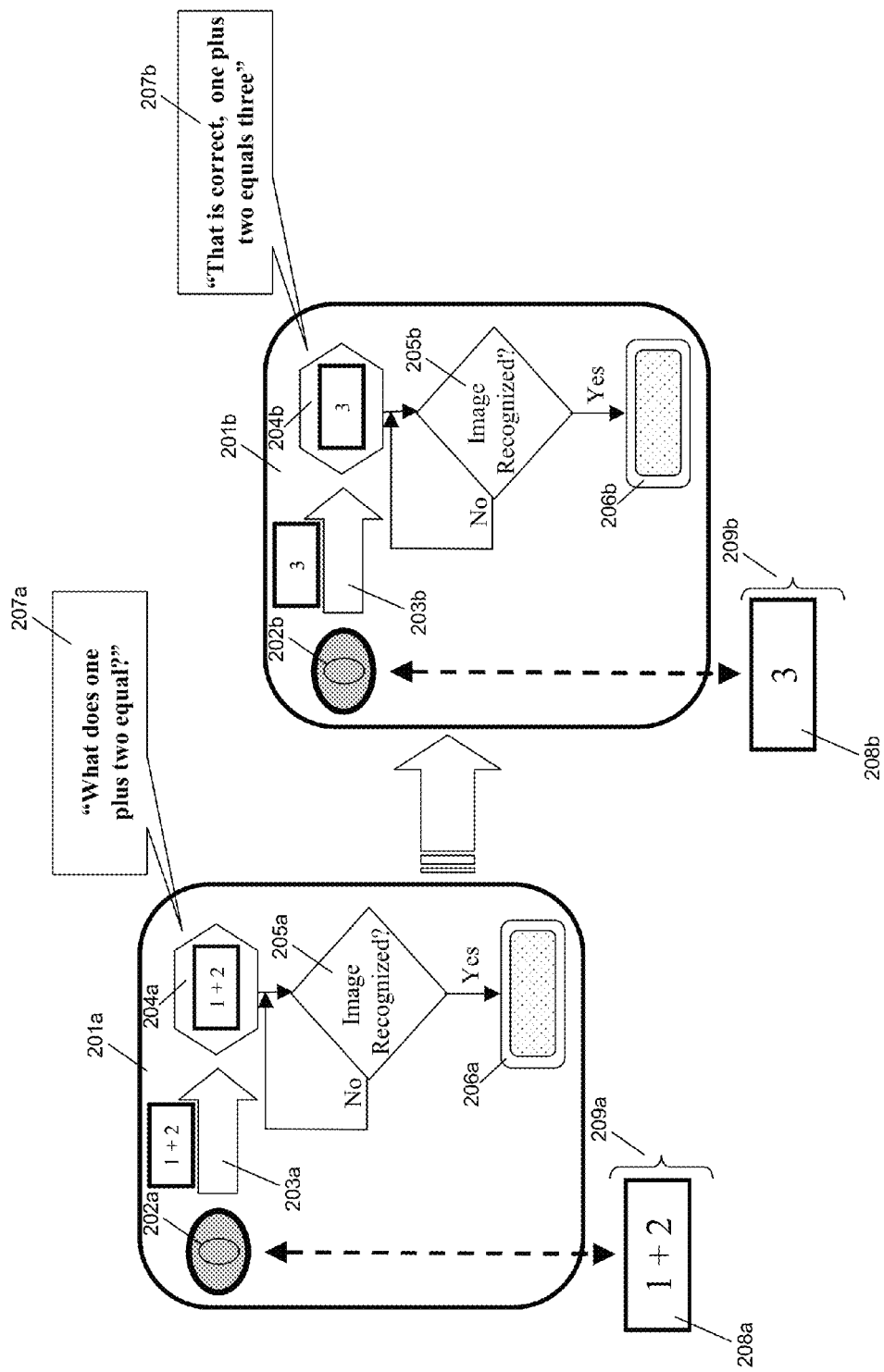
FIG. 2a illustrates an example method of a toy capturing a mathematical function image and providing a response.
FIG. 2b illustrates an example method of a toy receiving the correct answer to a mathematical function and providing a response.

Referring to FIGS. 2a and 2b, therein is depicted an example method of a toy capturing an image and providing a response. The video camera module 202a embedded in the toy 201a captures the image 208a provided on a flashcard 209a. The image 208a is the mathematical function "1+2." The video processing module 204a receives the image from the video camera module 204a and recognizes it as a pre-programmed image. The toy 201a processes 206a the information and responds by asking "What does one plus two equal?" 207a. When the user shows the flashcard 209b with the image of number 3 208b, the image is captured by the video camera module 202b and processed by the video processing module 204b, which recognizes the image 208b on the flashcard 209b. The toy 201b processes 206b the information and responds by stating "That is correct, one plus two equals three." 207b. Thus, as depicted in FIGS. 2a and 2b, embodiments provide a vision-recognition based technical solution for processing of data for interactive educational toy gameplay.

Embodiments provide that if images are shown sequentially, the vision processing software is capable of retaining in memory what has been shown. In addition, if images are shown simultaneously, the vision processing software is capable of recognizing all images and knowing their relative positioning. As a non-limiting example, if a toy is shown a flashcard with the images "C," "A", and "T", it would recognize the images together as forming the word "CAT" and would communicate the same to the user. In another non-limiting example, the toy asks the user to "show me the number 2," and would recognize if the user presented it with an image of the number 2. If the use showed the toy the number 2, the toy could respond by stating that the image was "correct." A further non-limiting example provides that the toy could ask the user to spell certain pre-determined words and recognize when the user has presented the word. Thus, a user would be able to achieve a high level of interaction with a toy according to embodiments, such as by answering the toy's questions by showing images to the toy.

As such, embodiments provide that vision recognition can be utilized to interpret the nature and position of an image or object and certain cues from the toy can be conveyed back to the user. As a non-limiting example, an animatronic toy with audio capability may convey movement cues, audio cues, or both simultaneously. A movement cue may include the toy moving certain parts, such as its arms or head, in response to the recognition or non-recognition of an image. While an audio cue may include the toy communicating certain phrases based upon the image shown by a user.

Figure 3:
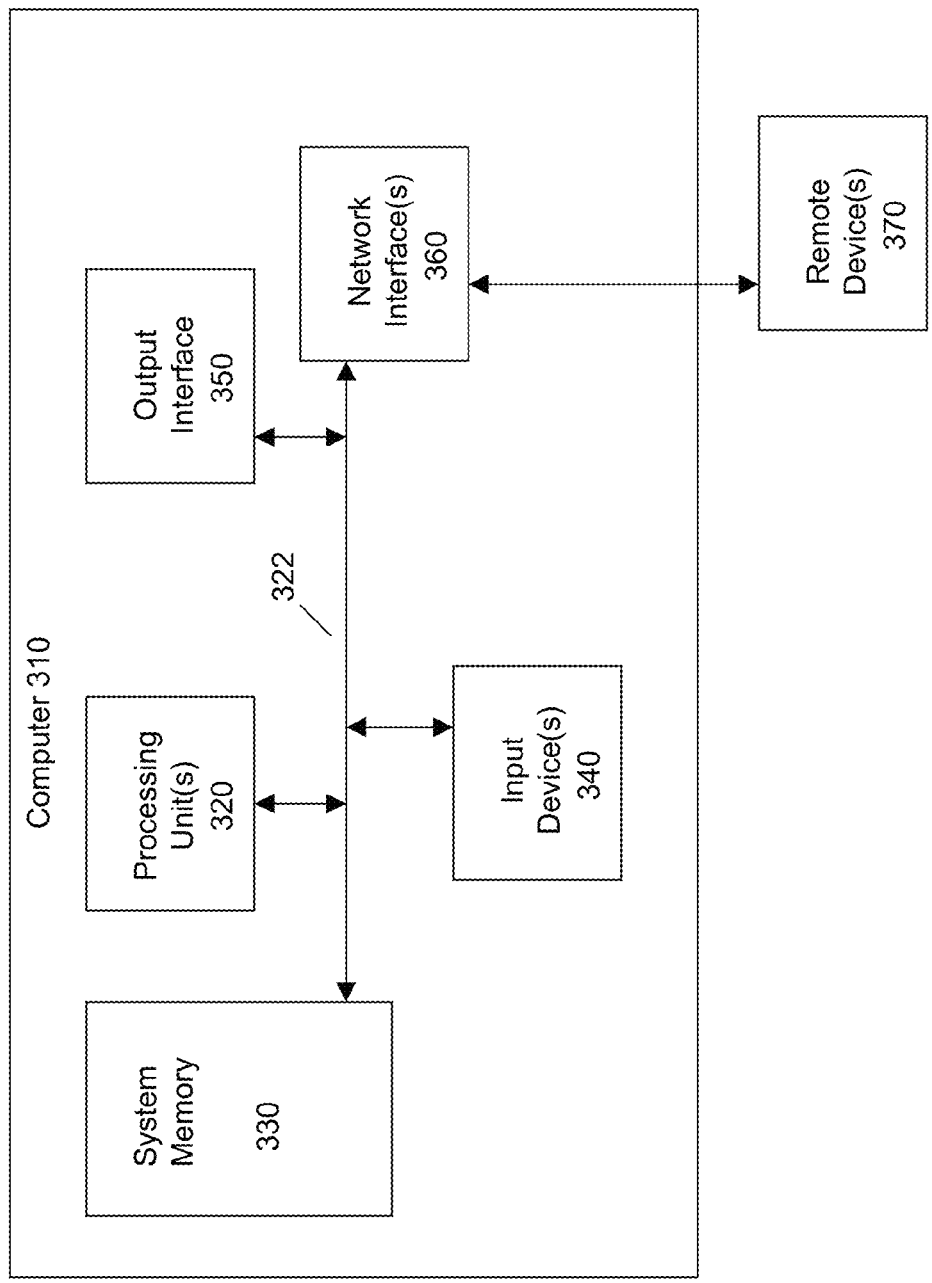
FIG. 3 illustrates an example computer system.

When applied to educational and storytelling applications, embodiments provide for the creation of an artificial intelligence system that responds to myriad combinations of images for mathematical calculation or spelling applications. As such, embodiments enable learning activities through the toy's ability to "see" objects it was trained to recognize and provide appropriate responses, creating a distinctive learning environment through the interaction between the user and the toy. the programming of the toy could Referring to FIG. 3, it will be readily understood that embodiments can be implemented using any of a wide variety of devices or combinations of devices. An example device that may be used in implementing one or more embodiments includes a computing device in the form of a computer 310. In this regard, the computer 310 may execute program instructions configured to perform steps involved in processing data regarding tracking objects/individuals within a show space, receiving and recording video data during a show, selecting an appropriate media content for inclusion in a custom media product, and perform other functionality of the embodiments, as described herein.

Components of computer 310 may include, but are not limited to, processing units 320, a system memory 330, and a system bus 322 that couples various system components including the system memory 330 to the processing unit 320. Computer 310 may include or have access to a variety of computer readable media. The system memory 330 may include computer readable storage media in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 310 through input devices 340, which can include remote input devices. Alternatively, a computer may run in a fully or semi-automated or unattended mode. A monitor or other type of device can also be connected to the system bus 322 via an interface, such as an output interface 350. In addition to a monitor, computers may also include other peripheral output devices. The computer 310 may operate in a networked or distributed environment using logical connections to one or more other remote computers or databases, such as a remotely located digital storage system configured to store video data, custom media content, stock media content, and/or tracking data. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative embodiments have been described herein with reference to the accompanying drawings, it is to be understood that the embodiments are not limited to those precise embodiments, and that various other changes and modifications may be affected therein by one skilled in the art without departing from the scope or spirit of the disclosure.

What is claimed is:

1. An interactive toy system comprising:
    a toy comprising one or more interactive functions;
    the toy being configured to provide audio output asking a user to show the toy one or more objects;
    one or more video capturing modules configured to capture image information corresponding to the one or more objects and send the image information to one or more video processing modules,
    the one or more video processing modules generating recognition information designating whether the image information matches one or more stored images via determining that the image information includes image information selected from the group consisting of: a predetermined image sequence and a predetermined image combination;
    one or more microprocessors configured to receive the recognition information;
    wherein, responsive to a match, the one or more microprocessors activate one or more interactive functions based on the recognition information received, the interactive function comprising asking the user for additional image information of another one or more objects associated with the captured image information; and
    one or more video capturing modules configured to capture the additional image information of the another one or more objects.

2. The interactive toy system according to claim 1, wherein the one or more interactive functions are selected from the group consisting of: motion, sound, light, and color.

3. The interactive toy system according to claim 1, wherein the one or more stored images are selected from the group comprising: numbers, letters, mathematical functions, colors, shapes, words, toys, clothing, and patterns.

4. The interactive, toy system according to claim 3, wherein the one or more stored images comprise a mathematical function and wherein activating the one or more interactive functions comprises:
    responding to the one or more microprocessors receiving recognition information matching an image of a mathematical function by asking the user for the answer to the mathematical function.

5. The interactive toy system according to claim 1, wherein the one or more video capturing modules comprise a CMOS camera module.

6. The interactive toy system according to claim 1, wherein to activate the one or more interactive functions activates a function selected from the group consisting of: motion planning, gameplay response, storytelling, and educational applications.

7. The interactive toy system according to claim 1, further comprising: one or more objects matching the one or more stored images.

8. The interactive toy system according to claim 7, wherein the one or more objects matching the one or more stored images are selected from the group consisting of: one or more flashcards, one or more books, one or more articles of clothing, and one or more toys.

9. The interactive toy system according to claim 1, wherein activating the one or more interactive functions based on the recognition information received comprises requesting a specific image.

10. A method of providing an interactive toy comprising:
    providing a toy comprising one or more interactive functions;
    embedding one or more video capturing modules, one or more video processing modules, and one or more microprocessors in the toy;
    configuring the toy to provide audio output asking a user to show an the toy one or more objects;
    configuring the one or more video capturing modules to capture image information corresponding to the one or more objects and send the image information to the one or more video processing modules, the one or more video processing modules generating recognition information designating whether the image information matches one or more stored images via determining that the image information includes image information selected from the group consisting of: a predetermined image sequence and a predetermined image combination;

configuring the one or more microprocessors to receive the recognition information;

wherein, responsive to a match, the one or more microprocessors activate one or more interactive functions based on the recognition information received, the interactive function comprising asking the user for additional image information of another one or more objects associated with the captured image information; and configuring the one or more video capturing modules to capture the additional image information of the another one or more objects.

11. The method of providing an interactive toy according to claim 10, wherein the one or more interactive functions are selected from the group consisting of: motion, sound, light, and color.

12. The method of providing an interactive toy according to claim 10, wherein the one or more stored images are selected from the group consisting of: numbers, letters, mathematical functions, colors, shapes, words, toys, clothing, and patterns.

13. The interactive toy system according to claim 12, wherein the one or more stored images comprise a mathematical function and wherein activating the one or more interactive functions comprises:

responding to the one or more microprocessors receiving recognition information matching an image of a mathematical function by asking the user for the answer to the mathematical function.

14. The method of providing an interactive toy according to claim 10, wherein the one or more video capturing modules comprise a CMOS camera module.

15. A method, comprising:

capturing, with a video capturing module disposed within a toy, image information corresponding to one or more objects presented by a user;

processing the image information to identify at least one of an image sequence and an image combination;

determining, with a processor, that the at least one of the image sequence and the image combination matches image information selected from the group consisting of: a predetermined image sequence and a predetermined image combination;

generating recognition information, with the processor, designating whether a match has been identified;

activating, responsive to a match, an interactive function based on the predetermined image sequence or predetermined image combination recognized, the interactive function comprising asking the user for additional image information of another one or more objects associated with the captured image information; and capturing, with a video capturing module, the additional image information of the another one or more objects.

16. The method of claim 15, wherein the predetermined image sequence comprises a sequential presentation by a user of images over time.

17. The method of claim 15, wherein the predetermined image sequence comprises a positional, sequential presentation of images by a user at the same time.

18. The method of claim 15, wherein the predetermined image combination comprises a combination of two or more images contained in a single object presented by a user.

19. The method of claim 15, wherein the predetermined image combination comprises a combination of two or more images contained in multiple objects presented by a user.

20. The method of claim 19, wherein the multiple objects are presented by a user at the same time.

* * * * *